United States Patent
Ito (10) Patent No.: US 11,445,069 B2
(45) Date of Patent: Sep. 13, 2022

(54) INSPECTION SYSTEM FOR DETERMINING A FAILURE OF IMAGE QUALITY OF A PRINTED PRODUCT AND SENDING A NOTIFICATION OF A JAM IN RESPONSE

(71) Applicant: CANON KABUSHIKI KAISHA, Tokyo (JP)

(72) Inventor: Aya Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/223,617

(22) Filed: Apr. 6, 2021

(65) Prior Publication Data
US 2021/0321007 A1 Oct. 14, 2021

(30) Foreign Application Priority Data
Apr. 8, 2020 (JP) .............................. JP2020-069493

(51) Int. Cl.
*H04N 1/00* (2006.01)
*G06T 7/00* (2017.01)
*H04N 1/32* (2006.01)

(52) U.S. Cl.
CPC ....... *H04N 1/00037* (2013.01); *G06T 7/0002* (2013.01); *H04N 1/00029* (2013.01); *H04N 1/3263* (2013.01)

(58) Field of Classification Search
CPC ........... H04N 1/00037; H04N 1/00029; H04N 1/3263
See application file for complete search history.

(56) References Cited

U.S. PATENT DOCUMENTS

| | | |
|---|---|---|
| 2015/0131116 A1 | 5/2015 | Sochi |
| 2017/0210581 A1* | 7/2017 | Van Acquoij .......... B65H 29/62 |
| 2017/0264754 A1* | 9/2017 | Mano ................. H04N 1/00076 |
| 2019/0312982 A1 | 10/2019 | Isokawa |
| 2020/0051231 A1 | 2/2020 | Tsukamoto |
| 2020/0210115 A1 | 7/2020 | Igawa |
| 2020/0322492 A1 | 10/2020 | Kurohata |
| 2021/0067649 A1 | 3/2021 | Okajima |
| 2021/0118115 A1 | 4/2021 | Tsukamoto |
| 2021/0321011 A1* | 10/2021 | Ito ............................ G06T 7/001 |
| 2021/0382669 A1* | 12/2021 | Kimura ................... G06F 3/121 |

FOREIGN PATENT DOCUMENTS

| | | |
|---|---|---|
| JP | 2015104853 A | 6/2015 |
| JP | 6044357 B2 | 12/2016 |

* cited by examiner

*Primary Examiner* — Benjamin O Dulaney
(74) *Attorney, Agent, or Firm* — Canon U.S.A., Inc. IP Division (57) ABSTRACT

Printing is performed based on a print job received from an information processing apparatus, the information processing apparatus is notified of a jam based on occurrence of the jam, and a reprint job for performing reprinting that is generated based on the notification of the jam is received from the information processing apparatus. A scanned image obtained by scanning a printed print product is transmitted to an inspection apparatus, and information indicating that an inspection result obtained by the inspection apparatus inspecting a quality of the print product is "fail" is received. Based on the reception of the information indicating the inspection result "fail", the information processing apparatus is notified of a jam, and a reprint job for performing reprinting that is generated based on the notification of the jam is received from the information processing apparatus.

11 Claims, 8 Drawing Sheets

FIG.8

# INSPECTION SYSTEM FOR DETERMINING A FAILURE OF IMAGE QUALITY OF A PRINTED PRODUCT AND SENDING A NOTIFICATION OF A JAM IN RESPONSE

BACKGROUND

Field of the Disclosure

The present disclosure relates to an inspection system that inspects the quality of a print product obtained by a printing apparatus.

Description of the Related Art

An inspection apparatus is known that reads a print product printed by a printing apparatus and inspects the quality of the print product. The inspection apparatus can detect an image defect such as stain or missing print, a character error, and a barcode quality.

If a resulting product in which a defect is detected and a resulting product in which a defect is not detected are discharged to the same sheet discharge destination, one cannot tell which resulting product has a defect.

To solve such an issue, a mechanism for, in a case where a defect is detected in a resulting product, temporarily saving subsequent sheets in a save area, performing recovery printing of the resulting product in which the defect has occurred, and then discharging a sheet subjected to the recovery printing together with the subsequent sheets to a planned sheet discharge destination is discussed in Japanese Patent Application Laid-Open No. 2015-104853.

In Japanese Patent Application Laid-Open No. 2015-104853, a mechanism specific to the inspection and the recovery printing is provided for recovery printing in a case where a defect is detected as a result of an inspection. Thus, the mechanism needs to be newly designed and implemented to carry out recovery printing in a case where a defect is detected as a result of an inspection, which is not versatile.

SUMMARY

The present disclosure is directed to providing a technique for reducing new implementation for recovery printing in a case where a defect is detected as a result of an inspection, and enhancing versatility thereby.

According to an aspect of the present disclosure, an inspection system includes a printing apparatus, an inspection apparatus that inspects a quality of a print product printed by the printing apparatus, and an information processing apparatus that transmits a print job to the printing apparatus, wherein the inspection apparatus includes a reception unit configured to receive, from the printing apparatus, a scanned image obtained by scanning a print product printed by the printing apparatus, an inspection unit configured to inspect a quality of the print product based on comparison between the received scanned image and a reference image, and a transmission unit configured to transmit, based on an inspection result obtained by the inspection unit inspecting the quality of the print product, information indicating an inspection result "fail" to the printing apparatus, wherein the printing apparatus includes a printing unit configured to perform printing based on a print job received from the information processing apparatus, a notification unit configured to notify the information processing apparatus of a jam based on occurrence of the jam, and the reception unit configured to receive the information indicating the inspection result "fail" from the inspection apparatus, wherein, based on the reception of the information indicating the inspection result "fail", the notification unit further notifies the information processing apparatus of a jam, and wherein the information processing apparatus includes a transmission unit configured to, based on reception of the notification of the jam, transmit to the printing apparatus a reprint job for performing reprinting from an image corresponding to a sheet which has jammed.

Further features of the present disclosure will become apparent from the following description of exemplary embodiments with reference to the attached drawings.

DESCRIPTION OF THE EMBODIMENTS

Exemplary embodiments for carrying out the present disclosure will be described below with reference to the drawings. Unless otherwise noted, the present disclosure can be applied to both an inspection apparatus composed of a single device and an inspection apparatus composed of a plurality of devices so long as a function according to the present disclosure is achieved. The present disclosure can also be applied to an inspection apparatus that makes a connection via a network such as a local area network (LAN) or a wide area network (WAN) and performs processing, so long as the function according to the present disclosure is achieved. That is, the configuration of a system which is described in the following exemplary embodiments and where various terminals are connected together is merely an example, and there are various examples of the configuration of the system according to the use or purpose.

Figure 1:
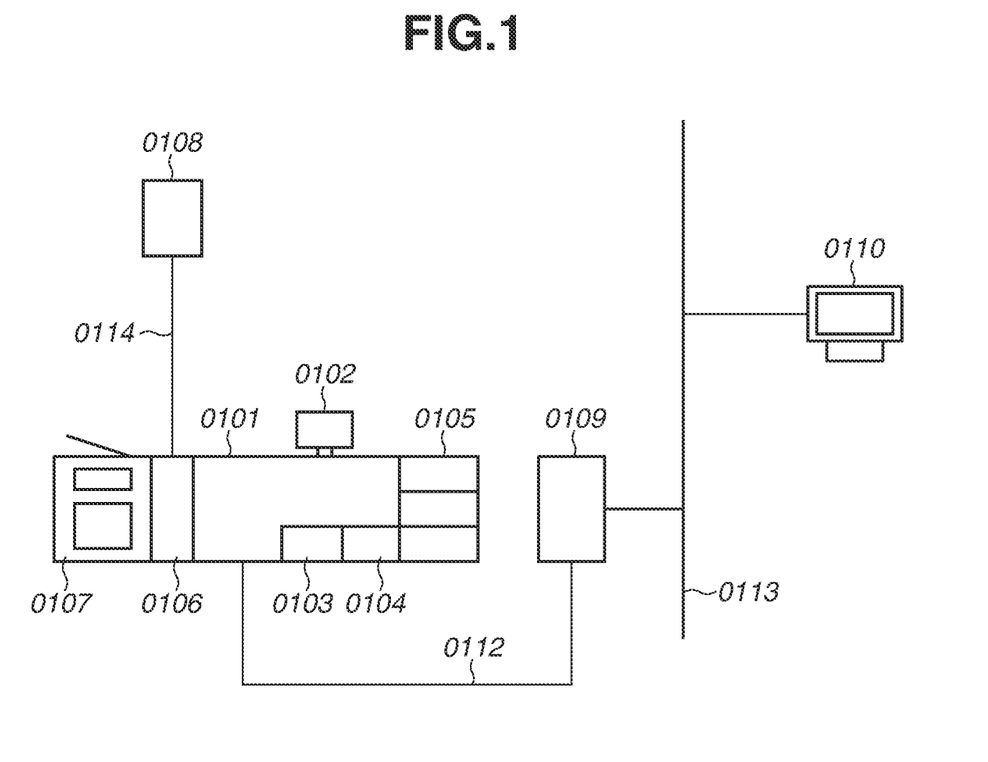
FIG. 1 is a schematic diagram illustrating configurations of an information processing apparatus, an inspection apparatus, and a printing apparatus.

FIG. 1 illustrates an inspection system according to the present exemplary embodiment and is a schematic diagram illustrating the configurations of an information processing apparatus, an inspection apparatus, and a printing apparatus. The printing apparatus according to the present exemplary embodiment is described using an electrophotographic printing apparatus, but may be a printing apparatus (an image forming apparatus) using a different image forming method such as an inkjet method or an offset method.

A printing apparatus 0101 is connected to an information processing apparatus 0109 via a network 0112. The information processing apparatus 0109 is connected to a client computer 0110 via a network 0113.

The printing apparatus 0101 includes a user interface (UI) panel 0102, a sheet feeding deck 0103, and a sheet feeding deck 0104. Further, an optional deck 0105 composed of three sheet feeding decks is connected to the printing apparatus 0101. The printing apparatus 0101 is, for example, an electrophotographic printing apparatus. The UI panel 0102 is, for example, a user interface including a touch panel of a capacitive type.

Further, the printing apparatus 0101 includes an inspection unit 0106 and a large-capacity stacker 0107. Particularly, the inspection unit 0106 may be included within the printing apparatus 0101. The inspection unit 0106 is connected to an inspection apparatus 0108 via a cable 0114. The large-capacity stacker 0107 includes a main tray and a top tray. The main tray can stack several thousands of sheets at a time.

A print job is generated by the client computer 0110, transmitted to the information processing apparatus 0109 via the network 0113, and managed by the information processing apparatus 0109. Then, the print job is transmitted from the information processing apparatus 0109 to the printing apparatus 0101 via the network 0112. Then, the printing apparatus 0101 performs the process of printing on a sheet. Alternatively, a form may be employed in which a print job is generated and managed by the information processing apparatus 0109, transmitted to the printing apparatus 0101 via the network 0112, and managed by the printing apparatus 0101.

In the present exemplary embodiment, the inspection apparatus 0108 is not connected to either of the information processing apparatus 0109 and the client computer 0110 via a network.

In addition to the inspection unit 0106 and the large-capacity stacker 0107, a finisher capable of stapling, a folding machine, or a bookbinding machine may be connected to or included within the printing apparatus 0101.

Figure 2:
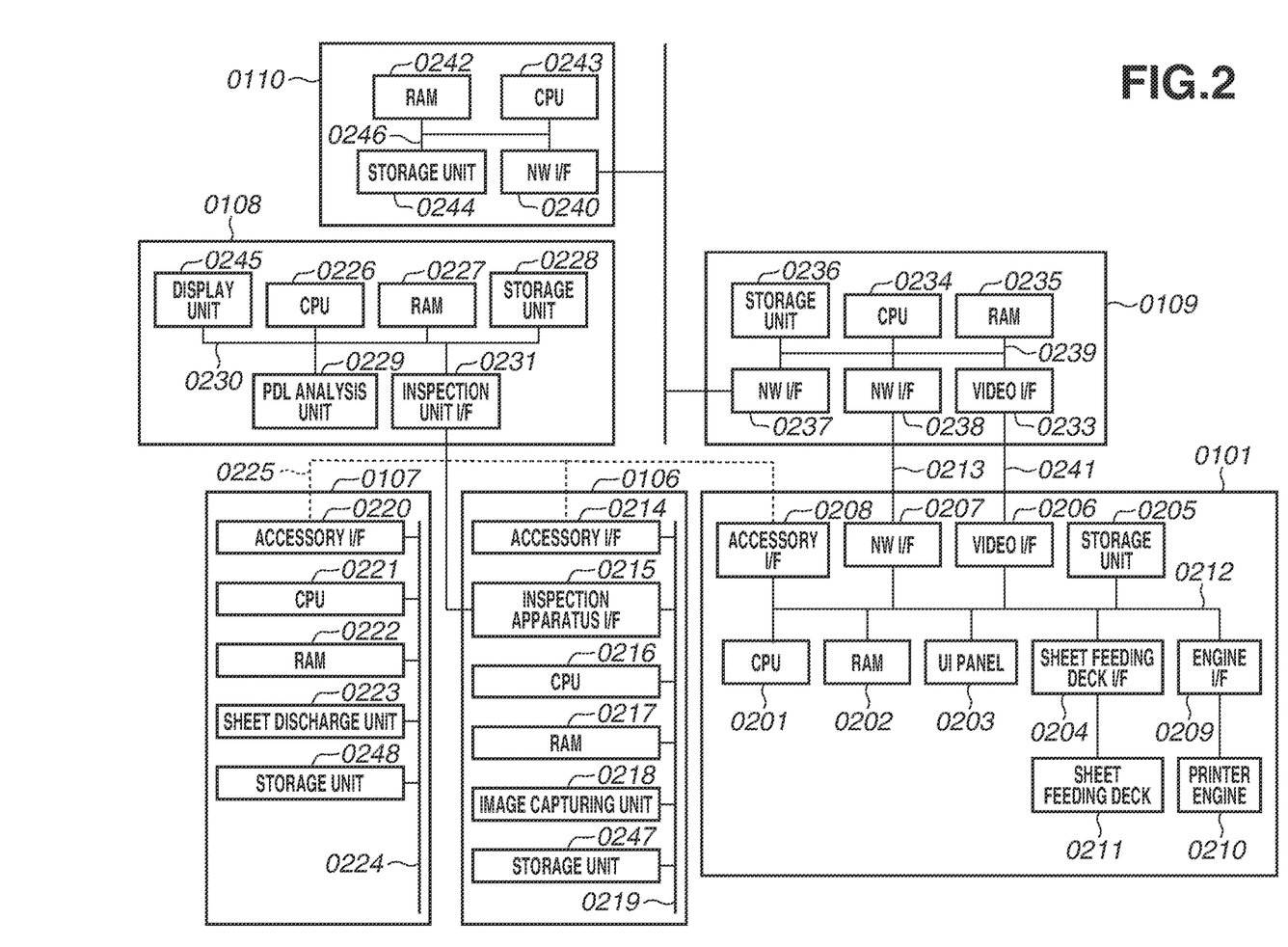
FIG. 2 is a block diagram illustrating the configurations of the information processing apparatus, the inspection apparatus, and the printing apparatus.

FIG. 2 is a block diagram illustrating the control configurations of the printing apparatus 0101, the inspection apparatus 0108, the large-capacity stacker 0107, the information processing apparatus 0109, and the client computer 0110 according to the present exemplary embodiment.

A central processing unit (CPU) 0201 governs control and calculation in components in the printing apparatus 0101 via a system bus 0212. The CPU 0201 governs the execution of a program stored in a storage unit 0205 and loaded into a random-access memory (RAM) 0202. The RAM 0202 is a type of general volatile storage device directly accessible by the CPU 0201 and is used as a work area for the CPU 0201 or another temporary data storage area. The storage unit 0205 functions as a temporary storage area and a work memory when the printing apparatus 0101 operates.

An engine interface (I/F) 0209 governs communication with and control of a printer engine 0210. A sheet feeding deck I/F 0204 governs communication with and control of a sheet feeding deck 0211. The sheet feeding deck 0211 is a collective term for the sheet feeding decks 0103 and 0104 and the optional deck 0105 as a hardware component. A UI panel 0203 is a hardware component of the UI panel 0102 and is a user interface for performing the overall operation of the printing apparatus 0101. In the present exemplary embodiment, the UI panel 0203 includes a touch panel of a capacitive type.

A network interface (hereinafter, "NW I/F") 0207 is connected to an NW I/F 0238 of the information processing apparatus 0109 via a cable 0213 and governs communication between the information processing apparatus 0109 and the printing apparatus 0101. In this example, a form is employed in which interfaces connected to the system bus 0212 and a system bus 0239 are directly connected together. Alternatively, a form may be employed in which the information processing apparatus 0109 and the printing apparatus 0101 are connected together, for example, via a network. In other words, the connection form between the information processing apparatus 0109 and the printing apparatus 0101 is not limited. A video I/F 0206 is connected to a video I/F 0233 via a video cable 0241 and governs the communication of image data between the information processing apparatus 0109 and the printing apparatus 0101.

Alternatively, in the information processing apparatus 0109, connection interfaces with the printing apparatus 0101 may employ a form in which the functions of the NW I/F 0238 and the video I/F 0233 are integrated together. In the printing apparatus 0101, connection interfaces with the information processing apparatus 0109 may employ a form in which the functions of the NW I/F 0207 and the video I/F 0206 are integrated together.

An accessory I/F 0208 connects to an accessory I/F 0214 and an accessory I/F 0220 via a cable 0225. That is, the printing apparatus 0101 communicates with the inspection unit 0106 and the large-capacity stacker 0107 via the accessory I/Fs 0208, 0214, and 0220.

A CPU 0216 governs, via a system bus 0219, control and calculation in components in the inspection unit 0106 and the execution of a program stored in a storage unit 0247 and loaded into a RAM 0217. The RAM 0217 is a type of general volatile storage device directly accessible by the CPU 0216 and is used as a work area for the CPU 0216 or another temporary data storage area. The storage unit 0247 functions as a temporary storage area and a work memory when the inspection apparatus 0108 operates. An inspection apparatus IF 0215 connects to an inspection unit F/F 0231 via a cable. That is, the inspection unit 0106 communicates with the inspection apparatus 0108 via the inspection apparatus I/F 0215 and the inspection unit I/F 0231.

An image capturing unit 0218 has an image capturing function and includes, for example, a contact image sensor (hereinafter, "CIS"). The image capturing unit 0218 captures an image of a sheet passing inside the inspection unit 0106 and transmits the captured image to the inspection apparatus 0108 via the inspection apparatus I/F 0215. The CIS included in the image capturing unit 0218 is merely an example of a sensor, and may be a sensor of another type such as a charge-coupled device (CCD) image sensor. That is, the image capturing method of the image capturing unit 0218 is not limited.

A CPU 0221 governs, via a system bus 0224, control and calculation in components in the large-capacity stacker 0107 and the execution of a program stored in a storage unit 0248 and loaded into a RAM 0222. The RAM 0222 is a type of general volatile storage device directly accessible by the CPU 0221 and is used as a work area for the CPU 0221 or another temporary data storage area. The storage unit 0248 functions as a temporary storage area and a work memory when the inspection apparatus 0108 operates. A sheet discharge unit 0223 governs an operation for discharging a sheet to the main tray and the top tray (a sub-tray), and monitoring and control of the stacking state of each of the main tray and the top tray.

A CPU 0226 governs, via a system bus 0230, control and calculation in components in the inspection apparatus 0108 and the execution of a program stored in a storage unit 0228 and loaded into a RAM 0227. The RAM 0227 is a type of general volatile storage device directly accessible by the CPU 0226 and is used as a work area for the CPU 0226 or another temporary data storage area. The storage unit 0228 functions as a temporary storage area and a work memory when the inspection apparatus 0108 operates. A page description language (PDL) analysis unit 0229 reads PDL data, such as PDF, PostScript, or Printer Command Language (PCL) data, received from the client computer 0110 or the information processing apparatus 0109 and executes the process of interpreting the PDL data. A display unit 0245 is, for example, a liquid crystal display connected to the inspection apparatus 0108. The display unit 0245 receives an input from a user to the inspection apparatus 0108 and displays the state of the inspection apparatus 0108. A CPU 0234 governs, via the system bus 0239, control and calculation in components in the information processing apparatus 0109 and the execution of a program stored in a storage unit 0236 and loaded into a RAM 0235. The RAM 0235 is a type of general volatile storage device directly accessible by the CPU 0234 and is used as a work area for the CPU 0234 or another temporary data storage area. The storage unit 0236 functions as a temporary storage area and a work memory when the information processing apparatus 0109 operates. An NW I/F 0237 is connected to an NW I/F 0240 via a network. The information processing apparatus 0109 communicates with the client computer 0110 via the NW I/Fs 0237 and 0240.

In the present exemplary embodiment, a form is described in which the information processing apparatus 0109 and the inspection apparatus 0108 do not communicate with each other. The form according to the present exemplary embodiment, however, is merely an example. Alternatively, a form may be employed in which the inspection apparatus 0108 includes an NW F/F, and the information processing apparatus 0109 communicates with the inspection apparatus 0108 via this NW/F and the NW I/F 0237.

A CPU 0243 governs, via a system bus 0246, control and calculation in components in the client computer 0110 and the execution of a program stored in a storage unit 0244 and loaded into a RAM 0242. The RAM 0242 is a type of general volatile storage device directly accessible by the CPU 0243 and is used as a work area for the CPU 0243 or another temporary data storage area. The storage unit 0244 functions as a temporary storage area and a work memory when the client computer 0110 operates.

Figure 3:
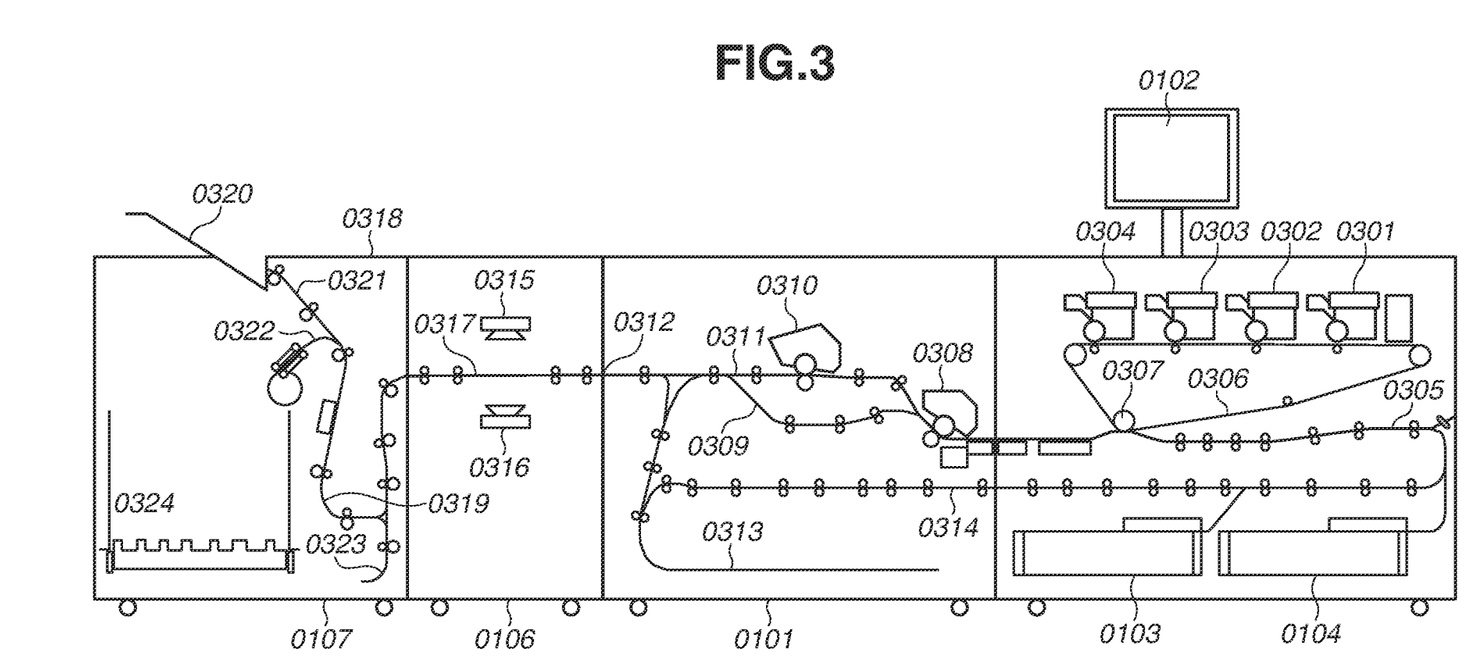
FIG. 3 is a diagram illustrating internal configurations of the information processing apparatus, an inspection unit, the printing apparatus, and a large-capacity stacker.

FIG. 3 is a diagram illustrating the internal configurations of the printing apparatus 0101, the inspection unit 0106, and the large-capacity stacker 0107. The printing apparatus 0101 receives an input from the user and displays the states of printing and devices through the UI panel 0102. The sheet feeding decks 0103 and 0104 can store various sheets. Each of the sheet feeding decks 0103 and 0104 can separate only the top sheet among the stored sheets and convey the separated sheet to a sheet conveying path 0305. Development stations 0301 to 0304 form toner images using colored toner of yellow (Y), magenta (M), cyan (C), and black (K), respectively, to form a color image. The toner images formed at this time are primarily transferred onto an intermediate transfer belt 0306. The intermediate transfer belt 0306 rotates clockwise in FIG. 3 and transfers the toner images onto the sheet conveyed from the sheet conveying path 0305 at a secondary transfer position 0307. A fixing unit 0308 includes a pressure roller and a heating roller. The sheet passes between the rollers, whereby the fixing unit 0308 melts and pressure-bonds the toner and fixes the toner images to the sheet. The sheet having come out of the fixing unit 0308 passes through a sheet conveying path 0309 and is conveyed to a portion 0312. If the toner needs to be further melted and pressure-bonded to fix the toner depending on the type of the sheet, after the sheet passes through the fixing unit 0308, the sheet is conveyed to a second fixing unit 0310 using an upper sheet conveying path. After the toner is additionally melted and pressure-bonded by the second fixing unit 0310, the sheet passes through a sheet conveying path 0311 and is conveyed to the portion 0312. If the image formation mode is set to two-sided printing, the sheet is conveyed to a sheet reverse path 0313, reversed in the sheet reverse path 0313, and then conveyed to a two-sided conveying path 0314. Then, an image is transferred onto the second surface of the sheet at the secondary transfer position 0307.

In the inspection unit 0106, CISs 0315 and 0316 are placed opposed to each other. The CIS 0315 is a sensor that reads an upper surface of the sheet, and the CIS 0316 is a sensor that reads a lower surface of the sheet. At the timing when the sheet conveyed to a sheet conveying path 0317 reaches a predetermined position, the inspection unit 0106 scans the sheet using the CIS 0315 or 0316. A scanned image obtained by scanning the sheet is transmitted to the inspection apparatus 0108 via the inspection apparatus I/F 0215 and the inspection unit I/F 0231. The CPU 0226 determines whether a defect is present in the received image. Then, the CPU 0226 notifies the inspection unit 0106 of the determination result via the inspection unit I/F 0231 and the inspection apparatus I/F 0215 again. The CPU 0216 notifies the large-capacity stacker 0107 of the received determination result via the accessory I/Fs 0214 and 0220.

The large-capacity stacker 0107 can stack a large number of sheets. The large-capacity stacker 0107 includes a main tray 0324 as a tray for stacking the sheet. The sheet having passed through the inspection unit 0106 enters the large-capacity stacker 0107 through a sheet conveying path 0319. The sheet is conveyed from the sheet conveying path 0319, passes through a sheet conveying path 0322, and is stacked in the main tray 0324. Further, the large-capacity stacker 0107 includes a top tray 0320 as a sheet discharge tray. The CPU 0221 discharges to the top tray 0320 a sheet in which a defect is detected by the inspection apparatus 0108. In a case where the sheet is to be output to the top tray 0320, the sheet is conveyed from the sheet conveying path 0319, passes through a sheet conveying path 0321, and is conveyed to the top tray 0320. A reverse unit 0323 reverses the sheet. The reverse unit 0323 is used to stack the sheet in the main tray 0324. To stack the sheet in the main tray 0324 so that the direction of the sheet when the sheet enters the large-capacity stacker 0107 and the direction of the sheet when the sheet is stacked are the same, the sheet is reversed once by the reverse unit 0323. To convey the sheet to the top tray 0320, the sheet is discharged as is without being flipped over when the sheet is stacked. Thus, the operation for reversing the sheet in the reverse unit 0323 is not performed.

Figure 4:
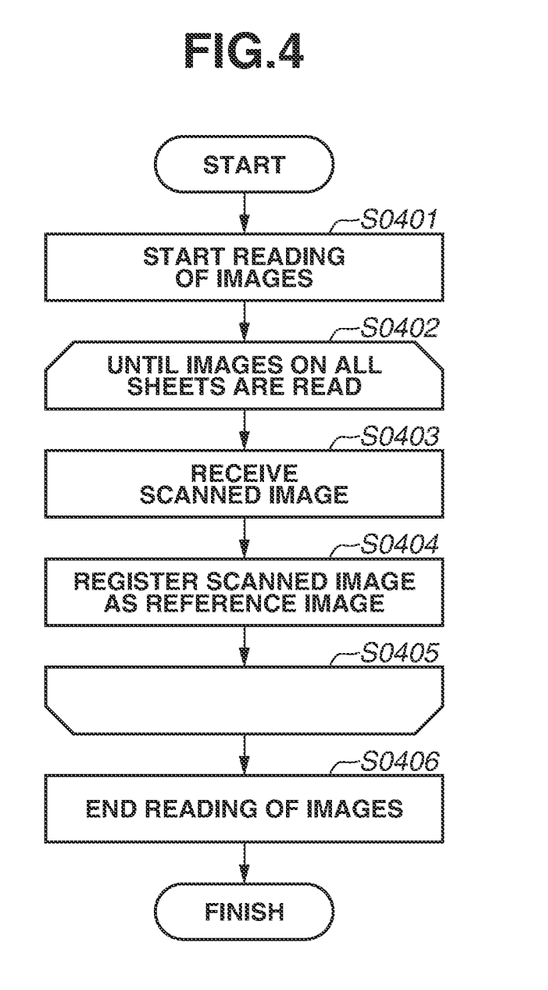
FIG. 4 is an operation flowchart of the inspection apparatus when a reference image is registered.

FIG. 4 is an operation flowchart of the inspection apparatus 0108 when a reference image for an inspection is registered.

In step S0401, the CPU 0226 receives an image reading start instruction from the user through an inspection button 0502 on the display unit 0245. Next, in step S0402, if there is a sheet on which an image is to be read, the processing proceeds to step S0403.

In step S0403, the inspection unit I/F 0231 receives an image scanned by the CIS 0315 or 0316 from the inspection apparatus I/F 0215. Next, in step S0404, the CPU 0226 registers the image received in step S0403 as a reference image in the RAM 0227.

Then, the processing proceeds to step S0405, and steps S0402 to S0405 are repeated until the reading of images on all the sheets is completed. If the reading of images on all the sheets is completed, then in step S0406, the CPU 0226 receives an image reading end instruction from the user on the display unit 0245.

The example illustrated here is merely an example. Alternatively, for example, the image reading start instruction from the user on the display unit 0245 may be automatically given in conjunction with a printing start instruction in the printing apparatus 0101, the information processing apparatus 0109, or the client computer 0110. The image reading end instruction from the user on the display unit 0245 may be automatically given in conjunction with the completion of printing in the printing apparatus 0101.

Yet alternatively, for example, a form may be employed in which the inspection apparatus 0108 reads a plurality of images on the same page and registers the result of combining the images as a reference image.

Processing as the feature of the present exemplary embodiment will be described below with reference to flowcharts.

A program for the printing apparatus 0101 regarding these flows is stored in the storage unit 0205 of the printing apparatus 0101, loaded into the RAM 0202, and executed by the CPU 0201. A program for the inspection apparatus 0108 regarding these flows is stored in the storage unit 0228 of the inspection apparatus 0108, loaded into the RAM 0227, and executed by the CPU 0226. A program for the information processing apparatus 0109 regarding these flows is stored in the storage unit 0236 of the information processing apparatus 0109, loaded into the RAM 0235, and executed by the CPU 0234. A program for the client computer 0110 regarding these flows is stored in the storage unit 0244 of the client computer 0110, loaded into the RAM 0242, and executed by the CPU 0243.

Figure 5:
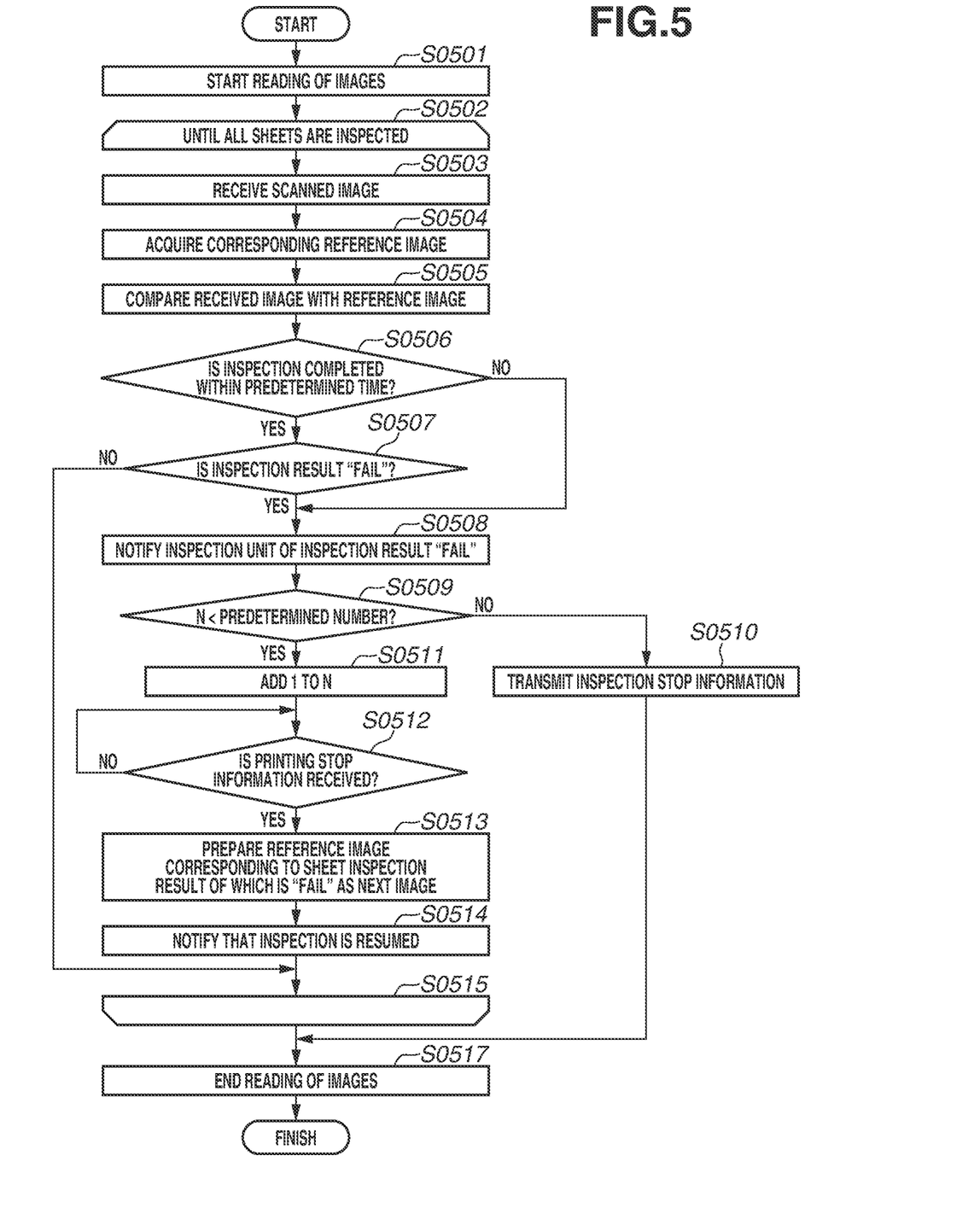
FIG. 5 is an operation flowchart of the inspection apparatus when an inspection is performed according to one or more aspects of the present disclosure.

FIG. 5 is an operation flowchart of the inspection apparatus 0108 when an inspection is performed.

In step S0501, the CPU 0226 receives an image reading start instruction from the user via the display unit 0245. Next, in step S0502, if there is a sheet as an inspection target, the processing proceeds to step S0503.

In step S0503, the inspection unit I/F 0231 receives an image scanned by the CIS 0315 or 0316 from the inspection apparatus I/F 0215. In step S0504, the CPU 0226 reads from the RAM 0227 a reference image for a corresponding page that is registered in step S0404.

Next, in step S0505, the CPU 0226 compares the reference image read in step S0504 and the scanned image of the inspection target received in step S0503. In this comparison operation, first, using characteristic points on the images as alignment reference points, the positions of the reference image and the scanned image of the inspection target are adjusted. Next, in the scanned image of the inspection target, the four corners of the sheet and the alignment reference point on the scanned image are analyzed, thereby detecting whether there is a positional shift in the image relative to the sheet. Next, the density value of the reference image and the density value of the scanned image of the inspection target are compared with each other on a pixel-by-pixel basis. As a result of the above, if a defect is not detected, the inspection result is "pass".

Next, in step S0506, if the inspection is completed within a predetermined time (YES in step S0506), the processing proceeds to step S0507. If the inspection is not completed within the predetermined time (NO in step S0506), the processing proceeds to step S0508. In the present exemplary embodiment, a series of processes for scanning an image of a sheet, inspecting the sheet, changing the sheet discharge destination of the sheet according to the inspection result, and discharging the sheet is sequentially executed for each page. Thus, the series of processes on a certain page needs to be completed so that the series of processes on the next page can be performed. In the present exemplary embodiment, in a case where the inspection result is not obtained by completing the inspection within a certain time, the same process as when it is determined that the inspection result is "fail" is performed. As a result, it is possible to prevent the situation where the series of processes on a certain sheet is not completed in time for the CIS 0315 or 0316 to scan the subsequent sheet, and the inspection unit I/F 0231 and the inspection apparatus I/F 0215 to start transmitting and receiving a scanned image obtained by scanning the sheet. This also enables the CPU 0221 to switch the conveyance destination of the sheet the inspection result of which is "fail" according to the determination of the inspection apparatus 0108, so that the sheet is discharged to the top tray 0320. The CPU 0226 needs to notify the CPU 0221 that the inspection result is "fail", via the inspection unit I/F 0231, the inspection apparatus/F 0215, the accessory I/F 0214, and the accessory I/F 0220 before the sheet reaches a point where the conveyance destination of the sheet cannot be switched.

Thus, if the inspection is not completed within the predetermined time, it cannot be determined that the inspection result is "pass", and therefore, the CPU 0226 determines that the inspection result is an error. Then, the CPU 0226 determines that the inspection result of the sheet is equivalent to the inspection result "fail".

In step S0507, if the inspection result is "fail" (YES in step S0507), the processing proceeds to step S0508. In step S0508, the CPU 0226 notifies the CPU 0216 that the inspection result is "fail", via the inspection unit I/F 0231 and the inspection apparatus I/F 0215.

Next, in step S0509, the CPU 0226 determines how many times in succession the inspection result "fail" has been obtained in the determination in step S0507. The number of times the inspection result "fail" is read in succession from the RAM 0227 is defined as N. If N reaches a predetermined number of times, the CPU 0226 stops the inspection. As a result, the CPU 0216 receives inspection stop information regarding the stop of the inspection via the inspection unit I/F 0231 and the inspection apparatus I/F 0215 and stops the inspection and the printing. This process is performed for the following purpose. In a case where the inspection result "fail" occurs a predetermined number of times or more in succession, it is determined that there is a possibility that some kind of abnormality is present in the printing apparatus 0101 or the CIS 0315 or 0316, and the operation is stopped once rather than continuing the inspection and the printing, thereby urging the user to confirm the system.

Figure 8:
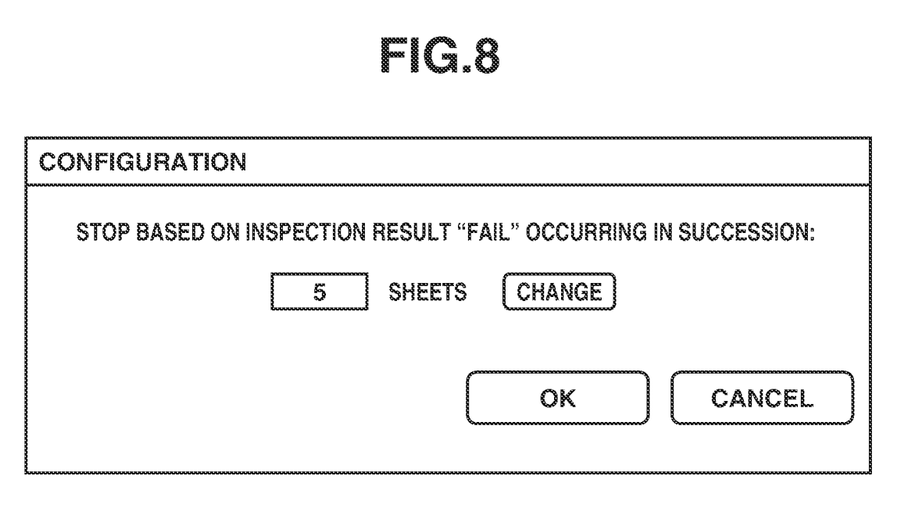
FIG. 8 is a setting screen regarding a stop based on an inspection result "fail" occurring in succession according to one or more aspects of the present disclosure.

In the present exemplary embodiment, the predetermined number of times to be reached by the number of times the inspection result "fail" occurs in succession so that the printing is stopped is five, for example. That is, in step S0509, if N<5 (YES in step S0509), the processing proceeds to step S0511. In step S0511, the CPU 0226 adds 1 to N and stores N in the RAM 0227. The predetermined number of times to be reached by the number of times the inspection result "fail" occurs in succession so that the printing is stopped may be held in advance in the inspection apparatus 0108. Alternatively, a setting screen as illustrated in FIG. 8 may be displayed on the inspection apparatus 0108, the user may be allowed to input a value through the setting screen in FIG. 8, and the input value may be held. The setting screen in FIG. 8 may be displayed on the printing apparatus 0101, allow the user to input a value, and the input value be transmitted to the inspection apparatus 0108.

Next, in step S0512, the CPU 0226 waits to receive printing stop information from the CPU 0216 via the inspection unit I/F 0231 and the inspection apparatus I/F 0215. When the CPU 0226 receives the printing stop information (YES in step S0512), the processing proceeds to step S0513. The printing stop information is received in a case where the printing is stopped in the printing apparatus 0101.

In step S0513, the CPU 0226 reads from the RAM 0227 the reference image corresponding to the sheet the inspection result of which is "fail" and holds the reference image as an image to be inspected next. In the present exemplary embodiment, for example, if the inspection result of an image on the third page of a print job is "fail", the printing apparatus 0101 reprints and scans the image on the third page (the third sheet), and therefore, the inspection apparatus 0108 subsequently sets a reference image on the third page (the third sheet) as an image to be inspected. Next, in step S0514, the CPU 0226 notifies the CPU 0216 via the inspection unit I/F 0231 and the inspection apparatus I/F 0215 that the inspection is resumed. That is, in the present exemplary embodiment, after the printing stop information is received, and if the inspection apparatus 0108 enters the state where the inspection apparatus 0108 can perform the inspection, the CPU 0226 transmits inspection resumption information.

Next, the processing proceeds to step S0515, and steps S0502 to S0515 are repeated until the inspection of all the sheets is completed. If the inspection of all the sheets is completed, then in step S0517, the CPU 0226 receives an image reading end instruction from the user via the inspection button 0502 on the display unit 0245.

In step S0507, if the inspection result is "pass" (NO in step S0507), the processing proceeds to step S0515. Then, the processing can end similarly to the above flow.

Further, in step S0509, if N is 5 (NO in step S0509), the processing proceeds to step S0510. In step S0510, the CPU 0226 stops the inspection and transmits inspection stop information to the CPU 0216 via the inspection unit I/F 0231 and the inspection apparatus I/F 0215. Then, the processing proceeds to step S0517. After that, the processing ends similarly to the above flow.

The example illustrated here is merely an example. Alternatively, for example, the image reading start instruction from the user on the display unit 0245 may be automatically given in conjunction with a printing start instruction in the printing apparatus 0101, the information processing apparatus 0109, or the client computer 0110. The image reading end instruction from the user on the display unit 0245 may be automatically given in conjunction with the completion of printing in the printing apparatus 0101.

Figure 6:
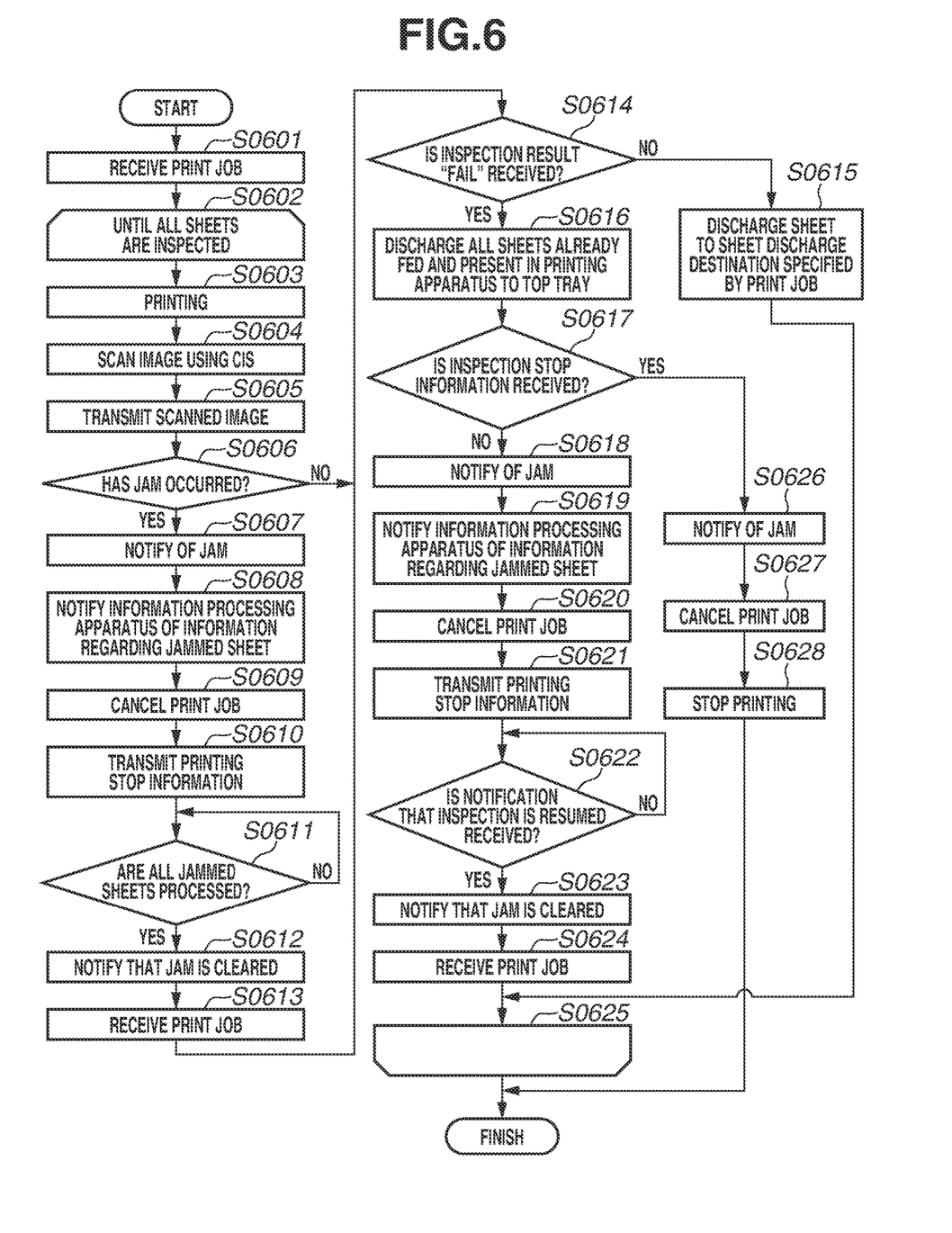
FIG. 6 is an operation flowchart of the inspection unit when an inspection is performed according to one or more aspects of the present disclosure.

FIG. 6 is an operation flowchart of the inspection unit 0106 when an inspection is performed.

In step S0601, the CPU 0201 receives a print job and starts printing. Next, in step S0602, if there is a sheet as an inspection target, the processing proceeds to step S0603.

In step S0603, the printing apparatus 0101 prints an image on the sheet. Next, in step S0604, the CIS 0315 or 0316 scans the image printed on the conveyed sheet. Next, in step S0605, the inspection apparatus I/F 0215 transmits the image scanned in step S0604 to the inspection unit I/F 0231.

Next, in step S0606, if the CPU 0201 detects a jam (YES in step S0606), the processing proceeds to step S0607. At this time, it does not matter where the jam has occurred within the printing apparatus 0101, the inspection unit 0106, or the large-capacity stacker 0107. That is, the location of the jam is not limited. If a jam occurs in the inspection unit 0106 or the large-capacity stacker 0107, the CPU 0201 acquires information regarding the jam and the position of the jam via the accessory I/Fs 0214, 0220, and 0208.

In step S0607, the CPU 0201 notifies the CPUs 0216 and 0221 of a jam state via the accessory U/Fs 0208, 0214, and 0220. The jam state includes jam position information that can be obtained by a sensor (not illustrated) within the printing apparatus 0101, the product inspection unit 0106, or the large-capacity stacker 0107 detecting a sheet. When printing is performed on a sheet and the sheet is discharged to outside the printing apparatus 0101, the CPU 0201 can detect that the discharge of the sheet is completed. Thus, the CPU 0201 can detect which sheet is jammed. Sheet information regarding the jammed sheet is also included in the jam state.

Then, in step S0608, the CPU 0201 notifies the CPU 0234 of the jam state (sheet information regarding a jammed sheet) via the NW U/Fs 0207 and 0238. Consequently, the information processing apparatus 0109 can know in which of the sheets used in the print job the jam has occurred, i.e., from which of the sheets recovery printing should be performed.

Next, in step S0609, the CPU 0201 cancels the print job. In step S0610, the CPU 0216 instructs the accessory I/Fs 0208, 0214, and 0220 to discharge sheets already fed from the sheet feeding deck 0103 or 0104 and present on the sheet conveying paths to a save space in the printing apparatus 0101 or the top tray 0320. In step S0610, when the sheets are saved, the CPU 0201 transmits printing stop information to the CPUs 0216 and 0221 via the accessory I/Fs 0208, 0214, and 0220. Next, in step S0611, the CPU 0201 waits until all the jammed sheets present in the printing apparatus 0101 are processed. If all the jammed sheets present in the printing apparatus 0101 are processed (YES in step S0611), the processing proceeds to step S0612. In step S0612, the CPU 0201 notifies the CPUs 0216 and 0221 via the accessory U/Fs 0208, 0214, and 0220 that the jam is cleared. The CPU 0201 also notifies the CPU 0234 via the NW I/Fs 0207 and 0238 that the jam is cleared.

Next, in step S0613, the CPU 0201 receives a print job for the jammed sheets and subsequent sheets and continues the printing, and the processing proceeds to step S0614.

Also if a jam has not occurred in step S0606 (NO in step S0606), the processing proceeds to step S0614.

In step S0614, if the inspection apparatus I/F 0215 receives the inspection result "fail" from the inspection unit I/F 0231 (YES in step S0614), the processing proceeds to step S0616. In step S0616, the CPU 0216 instructs the accessory I/Fs 0208, 0214, and 0220 to discharge to the top tray 0320 all the sheets, including a sheet the inspection result of which is "fail" and subsequent sheets, already fed from the sheet feeding deck 0103 or 0104 and present on the sheet conveying paths.

Next, in step S0617, if the CPU 0216 does not receive inspection stop information transmitted in step S0510 from the CPU 0226 via the inspection apparatus O/F 0215 and the inspection unit I/F 0231, i.e., if the inspection result "fail" has not occurred in five sheets in succession (NO in step S0617), the processing proceeds to step S0618. In step S0618, the CPU 0216 notifies the accessory I/Fs 0208, 0214, and 0220 of a jam state. The jam state includes jam position information that can be obtained by a sensor (not illustrated) within the product inspection unit 0106 detecting a sheet. In step S0618, although the sheets are already discharged to outside the printing apparatus 0101, the mechanism of a jam is used in a simulated manner.

Then, in step S0619, the CPU 0201 notifies the CPU 0234 of the jam state (sheet information regarding a sheet the discharge of which is not completed) via the NW I/Fs 0207 and 0238. When printing is performed on a sheet and the sheet is discharged to outside the printing apparatus 0101, the CPU 0201 can detect that the discharge of the sheet is completed. If a jam occurs, then as described in step S0608, the CPU 0201 notifies the information processing apparatus 0109 of a sheet the discharge of which is not completed when the jam occurs, as a jammed sheet. Also in step S0618, a notification that the jam has occurred is given in a simulated manner, thereby notifying the information processing apparatus 0109 of the jam state including sheet information regarding a sheet the discharge of which is not completed at that time, as a jammed sheet. This results in notifying the information processing apparatus 0109 of sheet information regarding the sheet the inspection result of which is "fail". Consequently, the information processing apparatus 0109 can know in which of the sheets used in the print job the jam has occurred, i.e., from which of the sheets recovery printing should be performed.

Next, in step S0620, the CPU 0201 cancels the print job. Then, in step S0621, the CPU 0216 transmits, to the CPU 0226 via the inspection apparatus I/F 0215 and the inspection unit I/F 0231, information indicating that all the sheets that should be discharged have been discharged in step S0616 and the printing apparatus 0101 has entered a printing stop state. Next, in step S0622, the CPU 0216 waits to acquire, via the inspection apparatus I/F 0215 and the inspection unit I/F 0231, information indicating that the inspection is resumed in step S0514. Then, in step S0623, the CPU 0216 notifies the accessory I/Fs 0208, 0214, and 0220 that the jam is cleared. In the present exemplary embodiment, a print product is scanned, a scanned image obtained by scanning the print product is inspected, and the sheet discharge destination of the print product is changed based on the inspection result. That is, unless processing is started in the state where the processing can be performed not only in the printing apparatus 0101 but also in the inspection apparatus 0108, the scanned image cannot be inspected, and the sheet discharge destination of the print product cannot be changed based on the inspection result. Thus, the jam is cleared after a notification that the inspection is resumed is received from the inspection apparatus 0108.

Next, in step S0624, the CPU 0201 receives a print job anew for the sheet the inspection result of which is "fail" and subsequent sheets. Then, the processing proceeds to step S0625, and steps S0602 to S0625 are repeated until the inspection of all the sheets is completed. If the inspection of all the sheets is completed, this means that the printing is also completed. Thus, the flow ends.

In step S0614, if the inspection apparatus I/F 0215 does not receive the inspection result "fail" (NO in step S0614), the processing proceeds to step S0615. In step S0615, the CPU 0216 instructs the accessory/Fs 0214 and 0220 to discharge this sheet to the sheet discharge destination specified by the print job. Then, the processing proceeds to step S0625. After that, the processing ends similarly to the above flow.

In step S0617, if the CPU 0216 receives inspection stop information transmitted in step S0510 from the CPU 0226 via the inspection apparatus IF 0215 and the inspection unit I/F 0231, i.e., if the inspection result "fail" occurs in five sheets in succession (YES in step S0617), the processing proceeds to step S0626. In step S0626, the CPU 0216 immediately stops the conveyance of a sheet and causes a jam to occur. The CPU 0216 also notifies the CPUs 0201 and 0221 of information regarding the jam via the accessory I/Fs 0208, 0214, and 0220. The present exemplary embodiment is described on the assumption that the CPU 0216 causes a jam to occur and stops the printing. However, for example, a form may be employed in which the CPU 0226 instructs the accessory I/Fs 0208, 0214, and 0220 to discharge all the sheets already fed from the sheet feeding deck 0103 or 0104 and present on the sheet conveying paths to the top tray 0320.

Next, in step S0627, the CPU 0201 cancels the print job. Next, in step S0628, the CPU 0201 stops the printing, and the processing ends.

This printing stop process based on the inspection result "fail" occurring in succession may be performed, for example, also in a case where a jam occurs on a sheet conveying path downstream of the CIS 0315 or 0316 in step S0606. This is because the CIS 0315 or 0316 has completed the scanning and the subsequent inspection of this sheet, and therefore, the CPU 0226 recognizes this sheet as an inspected sheet. At this time, if the print job spans a plurality of sheets, the CPU 0234 resumes the printing from an image printed on the inspected sheet. Thus, the image scanned by the CIS 0315 or 0316 when the printing is resumed and the reference image prepared by the CPU 0226 in step S0513 do not match.

In the present exemplary embodiment, a sheet the inspection result of which is "fail" is discharged to the top tray 0320. Alternatively, for example, the sheet may be discharged to a tray different from the sheet discharge destination specified by the print job. That is, the form of the sheet discharge destination is not limited to the top tray 0320.

Figure 7:
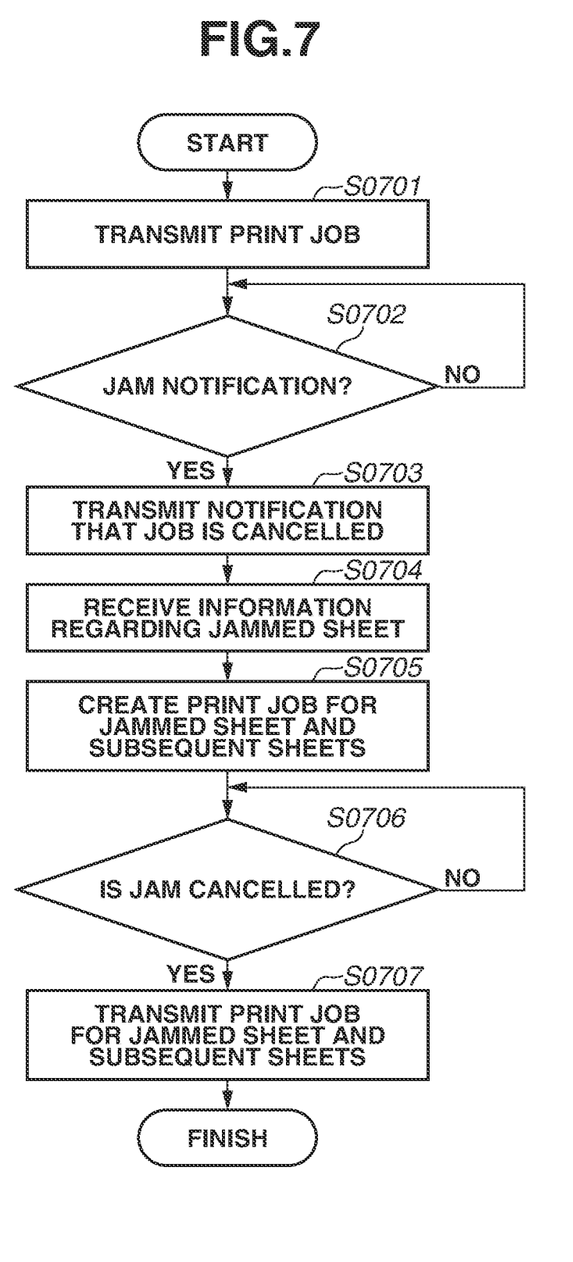
FIG. 7 is an operation flowchart of the information processing apparatus according to one or more aspects of the present disclosure.

FIG. 7 is an operation flowchart of the information processing apparatus 0109.

In step S0701, the CPU 0234 transmits a print job to the CPU 0201 via the NW I/Fs 0238 and 0207 and the video I/Fs 0223 and 0206. In step S0702, if a jam occurs in the printing apparatus 0101, the CPU 0234 acquires a jam notification issued in step S0608 or S0619 from the CPU 0201 via the NW I/Fs 0238 and 0207 (YES in step S0702), and the processing proceeds to step S0703. In step S0703, the CPU 0234 transmits, to the CPU 0201 via the NW I/Fs 0238 and 0207, a notification that the print job is cancelled.

Next, in step S0704, the CPU 0234 receives information regarding a jammed sheet via the NW I/Fs 0238 and 0207. Consequently, the CPU 0234 can know in which of the sheets the jam has occurred. Next, in step S0705, the CPU 0234 newly creates a print job (a reprint job) for the jammed sheet acquired in step S0704 and subsequent sheets. Then, in step S0706, the CPU 0234 waits to receive a notification that the jam is cleared in step S0612 or 0623. If the CPU 0234 receives a notification that the jam is cleared (YES in step S0706), the processing proceeds to step S0707. In step S0707, the CPU 0234 transmits the print job for the jammed sheet and the subsequent sheets to the CPU 0201 via the NW I/Fs 0238 and 0207 and the video I/Fs 0223 and 0206. Then, the flow ends.

In the present exemplary embodiment, since a mechanism that allows the inspection apparatus 0108 and the information processing apparatus 0109 to directly communicate with each other is not provided, the inspection apparatus 0108 cannot instruct the information processing apparatus 0109 to perform reprinting from a sheet the inspection result of which is "fail". As described above, however, according to the present exemplary embodiment, the inspection apparatus 0108 and the inspection unit 0106 can perform a recovery process for recovering from the inspection result "fail", using a mechanism for recovering from a jam in the information processing apparatus 0109.

Further, normally, a printing apparatus and an information processing apparatus that sends a job to the printing apparatus include a mechanism for recovering from a jam. Using this mechanism, it is possible to execute an inspection with minimum new implementation and special measures therefor. Since it is not necessary to provide a special mechanism in a printing machine, it is also possible to apply an inspection using an inspection apparatus to, for example, a printing machine manufactured by another company.

According to the above exemplary embodiment, in an inspection apparatus, an existing mechanism (a mechanism for recovering from a jam) is used for recovery printing in a case where a defect is detected as a result of an inspection. Thus, it is possible to reduce new implementation for recovery printing in a case where a defect is detected as a result of an inspection, and enhance versatility.

According to the above exemplary embodiment, it is possible to reduce new implementation for recovery printing in a case where a defect is detected as a result of an inspection, and enhance versatility.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-069493, filed Apr. 8, 2020, which is hereby incorporated by reference herein in its entirety.

What is claimed is:

1. An inspection system including a printing apparatus, an inspection apparatus that inspects a quality of a print product printed by the printing apparatus, and an information processing apparatus that transmits a print job to the printing apparatus, wherein the inspection apparatus comprises:
   a reception unit configured to receive, from the printing apparatus, a scanned image obtained by scanning a print product printed by the printing apparatus;
   an inspection unit configured to inspect a quality of the print product based on comparison between the received scanned image and a reference image; and
   a transmission unit configured to transmit, based on an inspection result obtained by the inspection unit inspecting the quality of the print product, information indicating that an inspection result is failure to the printing apparatus, wherein the printing apparatus comprises:
   a printing unit configured to perform printing based on a print job received from the information processing apparatus;
   a notification unit configured to notify the information processing apparatus of a first jam based on occurrence of the jam; and
   the reception unit configured to receive the information indicating that the inspection result is failure from the inspection apparatus, wherein, based on the reception of the information indicating that the inspection result is failure, the notification unit further notifies the information processing apparatus of a second jam, and wherein the information processing apparatus comprises a transmission unit configured to, based on reception of the notification of the first jam or the second jam, transmit to the printing apparatus a reprint job for performing reprinting from an image corresponding to a sheet which has jammed.

2. The inspection system according to claim 1, wherein the printing apparatus further comprises a control unit configured to control a sheet discharge destination of the print product based on the inspection result obtained by the inspection unit inspecting the quality of the print product.

3. The inspection system according to claim 1,
wherein the reception unit of the printing apparatus further receives inspection resumption information from the inspection apparatus, and
wherein the printing apparatus further comprises a clearing unit configured to clear a jam based on the received inspection resumption information.

4. The inspection system according to claim 3,
wherein the reception unit of the inspection apparatus further receives printing stop information from the printing apparatus, and
wherein, after the reception unit of the inspection apparatus receives the printing stop information, and in a case where the inspection apparatus enters a state where the inspection apparatus can perform an inspection, the transmission unit of the inspection apparatus transmits the inspection resumption information to the printing apparatus.

5. The inspection system according to claim 1, wherein, in a case where the inspection unit detects the inspection result fail a predetermined number of times in succession, the transmission unit of the inspection apparatus transmits inspection stop information to the printing apparatus.

6. A printing apparatus comprising:
   a printing unit configured to perform printing based on a print job received from an information processing apparatus;
   a notification unit configured to notify the information processing apparatus of a first jam based on occurrence of the jam;
   a transmission unit configured to transmit to an inspection apparatus a scanned image obtained by scanning a print product printed by the printing unit; and
   a reception unit configured to receive, from the inspection apparatus, information indicating that the inspection result is failure,
   wherein, based on the reception of the information indicating that the inspection result is failure, the notification unit further notifies the information processing apparatus of a second jam, and
   wherein the reception unit further receives, from the information processing apparatus, a reprint job for performing reprinting that is generated based on the notification of the first jam or the second jam given by the notification unit.

7. The printing apparatus according to claim 6, further comprising a control unit configured to control a sheet discharge destination of the print product based on the inspection result obtained by the inspection apparatus inspecting the quality of the print product.

8. The printing apparatus according to claim 6,
   wherein the reception unit further receives inspection resumption information from the inspection apparatus, and
   wherein the printing apparatus further comprises a clearing unit configured to clear a jam based on the received inspection resumption information.

9. A control method for controlling a printing apparatus, the control method comprising:
   performing printing based on a print job received from an information processing apparatus;
   notifying the information processing apparatus of a first jam based on occurrence of the jam;
   transmitting to an inspection apparatus a scanned image obtained by scanning a printed print product;
   receiving, from the inspection apparatus, information indicating that the inspection result is failure;
   notifying the information processing apparatus of a second jam based on the reception of the information indicating that the inspection result is failure; and
   receiving, from the information processing apparatus, a reprint job for performing reprinting that is generated based on the notification of the first jam or the second jam.

10. The control method for controlling the printing apparatus according to claim 9, the control method further comprising controlling a sheet discharge destination of the print product based on the inspection result obtained by inspecting the quality of the print product.

11. The control method for controlling a printing apparatus according to claim 9, the control method further comprising:
   receiving inspection resumption information from the inspection apparatus, and
   clearing a jam based on the received inspection resumption information.

* * * * *